(12) United States Patent  (10) Patent No.: US 7,540,132 B2
Shimada et al.  (45) Date of Patent: Jun. 2, 2009

(54) ELECTRIC WORKING MACHINE

(75) Inventors: Kenzo Shimada, Wako (JP); Takao Kobayashi, Wako (JP); Tetsuo Iida, Wako (JP); Toshiaki Takizawa, Wako (JP); Yasunori Yamamoto, Wako (JP); Yoshihisa Hirose, Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 1410 days.

(21) Appl. No.: 10/177,416

(22) Filed: Jun. 21, 2002

(65) Prior Publication Data

US 2003/0037523 A1 Feb. 27, 2003

(30) Foreign Application Priority Data

Aug. 22, 2001 (JP) .............................. 2001-252039
Aug. 22, 2001 (JP) .............................. 2001-252045

(51) Int. Cl.
*A01D 69/00* (2006.01)
(52) U.S. Cl. ........................................ 56/11.9; 56/320.1
(58) Field of Classification Search .................. 56/11.9, 56/320.1, 1, 320.2, 11.1; 180/229
See application file for complete search history.

(56) References Cited

U.S. PATENT DOCUMENTS

| | | | | |
|---|---|---|---|---|
| 3,564,186 A | * | 2/1971 | Mittelstadt et al. .......... | 200/331 |
| 3,924,389 A | * | 12/1975 | Kita ......................... | 56/10.2 A |
| 4,458,472 A | * | 7/1984 | Christopherson ........... | 56/10.5 |
| 5,309,080 A | | 5/1994 | Odendahl et al. ............. | 320/35 |
| 5,402,626 A | * | 4/1995 | Zinck ......................... | 56/11.9 |
| 5,490,370 A | * | 2/1996 | McNair et al. ................ | 56/11.9 |
| 5,526,633 A | * | 6/1996 | Strong et al. ................. | 56/17.2 |
| 5,619,845 A | | 4/1997 | Bruener et al. ............... | 56/11.9 |
| 5,819,513 A | | 10/1998 | Braun et al. .................. | 56/11.9 |
| 5,937,622 A | * | 8/1999 | Carrier et al. ................ | 56/11.9 |
| 5,953,890 A | * | 9/1999 | Shimada et al. .............. | 56/11.9 |
| 6,018,937 A | * | 2/2000 | Shimada et al. .............. | 56/10.5 |
| D458,277 S | * | 6/2002 | Stratford ...................... | D15/14 |
| 6,651,900 B1 | * | 11/2003 | Yoshida ....................... | 239/72 |
| 6,658,829 B2 | * | 12/2003 | Kobayashi et al. ........... | 56/10.5 |

FOREIGN PATENT DOCUMENTS

| | | |
|---|---|---|
| EP | 0300383 | 1/1989 |
| JP | 09065752 | 3/1997 |
| JP | 10191750 | 7/1998 |

OTHER PUBLICATIONS

"Connect", Merriam-Webster Collegiate Dictionary, 10th ed. United States of America, 1997, pp. 244.*

* cited by examiner

*Primary Examiner*—Alicia M Torres
(74) *Attorney, Agent, or Firm*—Adams & Wilks

(57) ABSTRACT

In an electric working machine, a scroll portion is provided at one of left and right sides of a machine body, and a relay member functioning as a power switch in which a power on/off key is removably inserted is provided at the other side of the machine body. The relay member is provided between a motor-driving battery and a control section so that the battery and control section can be electrically connected with each other by insertion, in the relay member, of the power on/off key and disconnected from each other by removal, from the relay member, of the power on/off key.

8 Claims, 13 Drawing Sheets

ELECTRIC WORKING MACHINE

FIELD OF THE INVENTION

The present invention relates to electric lawn mowers of a type where an electric motor is turned on or off by inserting or removing a power on/off key into or from a machine body section and where a cutter blade within a cutter housing is rotated by the electric motor to cut the grass and resulting grass clippings are delivered, through a scroll portion within the cutter housing, to a rear portion of the machine body section so that the grass clippings are ultimately collected into a grass bag. The present invention also relates to electric working machines in which an electric motor is rotated by a battery under control of a control section so that a machine body section can travel and perform any of various operations as desired by a human operator.

BACKGROUND OF THE INVENTION

Various electric lawn mowers and other types of electric working machines have been known, among which are a battery-powered lawn mower disclosed in Japanese Patent No. 2,837,960, an electric working machine disclosed in Japanese Patent Laid-open Publication No. HEI-10-191750 and a battery-powered electric working machine disclosed in Japanese Patent Laid-open Publication No. HEI-9-65752.

The battery-powered lawn mower disclosed in the No. 2,837,960 patent includes an electric motor mounted on a vehicle chassis and covered with a housing and a battery pack accommodated in the housing, in which a power on/off key is removably inserted in an upper portion of the housing rearwardly of the battery pack. The electric working machine disclosed in the No. HEI-10-191750 publication includes a motor switch provided on a rear end portion of a cutter housing cover, where the motor switch is operated by turning of a power on/off key inserted in the switch.

Generally, in the electric lawn mowers of the type where grass clippings are delivered, through the scroll portion, to a rear portion of the machine body to be ultimately collected into the grass bag, there arises a need to clean the scroll portion from time to time because the grass clippings tend to adhere to the surface of the scroll portion. For cleaning the scroll portion in the above-discussed battery-powered lawn mower, where the power on/off key is provided in an upper rear portion thereof, it is necessary for a human operator to move over to a rear portion of the machine body so as to pull the power on/off key out of the housing and then move to a side of the machine body so as to lay the machine body down sideways for access to the scroll portion. Similarly, for cleaning the scroll portion in the above-discussed electric working machine, where the motor switch is provided on a rear end portion of the cutter housing cover, it is necessary for a human operator to move over to a rear portion of the machine body so as to pull the power on/off key out of the motor switch and then move to a side of the machine body so as to lay the machine body down sideways for access to the scroll portion. Namely, for both the known battery-powered lawn mower and the known electric working machine, it is desirable that the power on/off key be inserted in such a position of the lawn mower or working machine as to allow the human operator to easily clean the scroll portion.

Further, in the electric working machine disclosed in the No. HEI-10-1917150 publication, the motor switch is provided on a support plate having a charging connector mounted thereon, and the motor switch and charging connector are exposed for external access through an opening formed in the housing cover. Here, when the working machine is activated by turning the power on/off key inserted in the motor switch, a manipulating portion of the power on/off key overlaps or covers the charging connector to prevent a recharger from being mistakenly connected to the working machine during operation of the working machine. Further in the battery-powered electric working machine disclosed in the No. HEI-9-65752 publication, a charging socket and interlocking switch for turning on/off a power supply circuit are both provided on a charging operation panel, and a cover member is also provided on the charging operation panel for sliding movement between the socket and the interlocking switch. Here, the cover member has a projection to cause the interlocking switch to be turned on as the cover member covers the socket but turned off as the cover member uncovers the socket.

However, although the electric working machine disclosed in the No. HEI-10-191750 publication has not only the primary safety function performed by the motor switch and power on/off key but also the extra function of preventing the recharger from being mistakenly connected to the working machine during operation of the working machine, it can not perform these two safety functions by means of a single simplified structure; namely, the primary safety function and the extra function of preventing mis-connection of the recharger have to be performed by separate elements. Further, because the projection is integrally formed on the cover member in the battery-powered electric working machine in the No. HEI-9-65752 publication, the working machine is activatable only via a key switch mechanism while sacrificing part of the necessary safety function; that is, the safety function of a key switch mechanism and the safety function relating to connection with the recharger can not be performed simultaneously, and thus one cannot help saying that the disclosed electric working machine is unsatisfactory from the viewpoint of safety.

SUMMARY OF THE INVENTION

In view of the foregoing prior art problems, it is an object of the present invention to provide an improved electric lawn mower which can facilitate cleaning of a scroll portion.

It is another object of the present invention to provide an improved electric working machine which can perform, through a single simplified structure, both a safety function of a key switch mechanism and a safety function relating to connection with a recharger.

According to an aspect of the present invention, there is provided an electric lawn mower which comprises: a machine body section; an electric motor mounted in the machine body section for being turned on by inserting a main key in a predetermined connection (ie.e, power switch) of the machine body section and turned off by removing the power on/off key from the predetermined connection; a cutter blade disposed within a cutter housing and rotatable via the electric motor to cut grass; and a scroll portion disposed in the cutter housing so that clippings of the grass cut by the cutter blade are delivered through the scroll portion into a grass bag disposed attached to a rear portion of the machine body section. In this lawn mower, the scroll portion is provided proximate one of the left and right lateral sides of the machine body section while the predetermined connection for removal insertion therein of the power on/off key is provided at the other of the left and right lateral sides of machine body section.

As set forth above, in the electric lawn mowers of the type where grass clippings are delivered, through the scroll portion to a rear portion of the machine body to be ultimately collected into the grass bag, there would arise a need to clean the scroll portion from time to time because the grass clippings tend to adhere to the surface of the scroll portion. Thus, there has been a strong demand for a sophisticated electric lawn mower of which the scroll portion can be cleaned by a human operator with increased ease. This demand can be fully satisfied by the electric lawn mower of the present invention, which is characterized in that the scroll portion is provided proximate one of the left and right lateral sides of the machine body section while the female connection (i.e., power switch) for removable insertion therein of the power on/off key is provided at the other of the left and right lateral sides of the machine body section. Thus, the user can pull the power on/off key out of the female connection in the machine body section and lay the machine body section down sideways while staying at a same side of the machine body section. That is, the user is allowed to perform the two necessary operations: insertion or removal of the power on/off key; and sideways layingdown of the machine body section, without having to change his or her operating position. As a result, the scroll portion can be cleaned with greatly enhanced efficiency and ease. Further, by providing the female machine-side conenction integrally with the motorcontrolling control section, the present invention permits efficient assemblage of the electric lawn mower.

According to another aspect of the present invention, there is provided an electric working machine which comprises: a machine body section; a rechargeable battery mounted in the machine body section; an electric motor rotatable by the battery; a control section that controls the electric motor to allow the machine body section to travel and perform any of various functions; and a relay member having a primary function as a power switch and provided between the battery and the control section for electrical connection therebetween. Here, the battery and the control section can be electrically connected with each other by insertion, in there lay member, of a predetermined connecting member, such as a power on/off key, and disconnected from each other by removal, from the relay member, of the predetermined connecting member.

With the arrangement that the battery and the control section can be completely disconnected from each other by removal, from the relay member, of the predetermined connecting member, it is possible to minimize unnecessary electrical discharge from the battery during a non-operating or quiescent period of the electric working machine, and prevent overdischarge during long-time storage of the working machine. As a result, the battery can have longer operating life.

In a specific implementation of the invention, the relay member includes a machine-side connecting portion integrally provided thereon for connection with a recharger to recharge the battery so that the same relay member can be selectively connected with either the predetermined connecting member, such as a power on/off key, or the recharger, as necessary. Namely, the predetermined connecting member, such as a power on/off key, can be inserted and connected to the relay member when the electric working machine is to operate to perform its primary function, such as a grass cutting function, while there charger can be inserted and connected to the relay member when the battery is to be recharged. As a result, the electric working machine can work with increased convenience and efficiency during the discharge (i.e., during grass cutting operations) or recharge of the battery, while reliably avoiding mis-insertion of the predetermined connecting member or recharger.

The battery employed in the present invention is preferably a nickel- or lithium-based battery. It is generally known that the temperature of the nickel- or lithium-based battery can be controlled relatively easily during recharging operations. Thus, the nickel- or lithium-based battery employed in the present invention can be recharged with significantly improved efficiency. Further, the control section has a function for monitoring and controlling the temperature of the battery, so that the battery can be recharged with enhanced reliability. As a result of which the battery can have prolonged operating life Further, in the electric working machine, the relay member includes a positive terminal connected with a positive pole of the battery, and the positive terminal of the relay member functions also as a charging positive terminal for connecting the recharger with the positive pole of the battery. This arrangement can simplify the construction of the control section and relay member. As a result, the necessary overall cost of the electric working machine can be reduced to a considerable degree.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
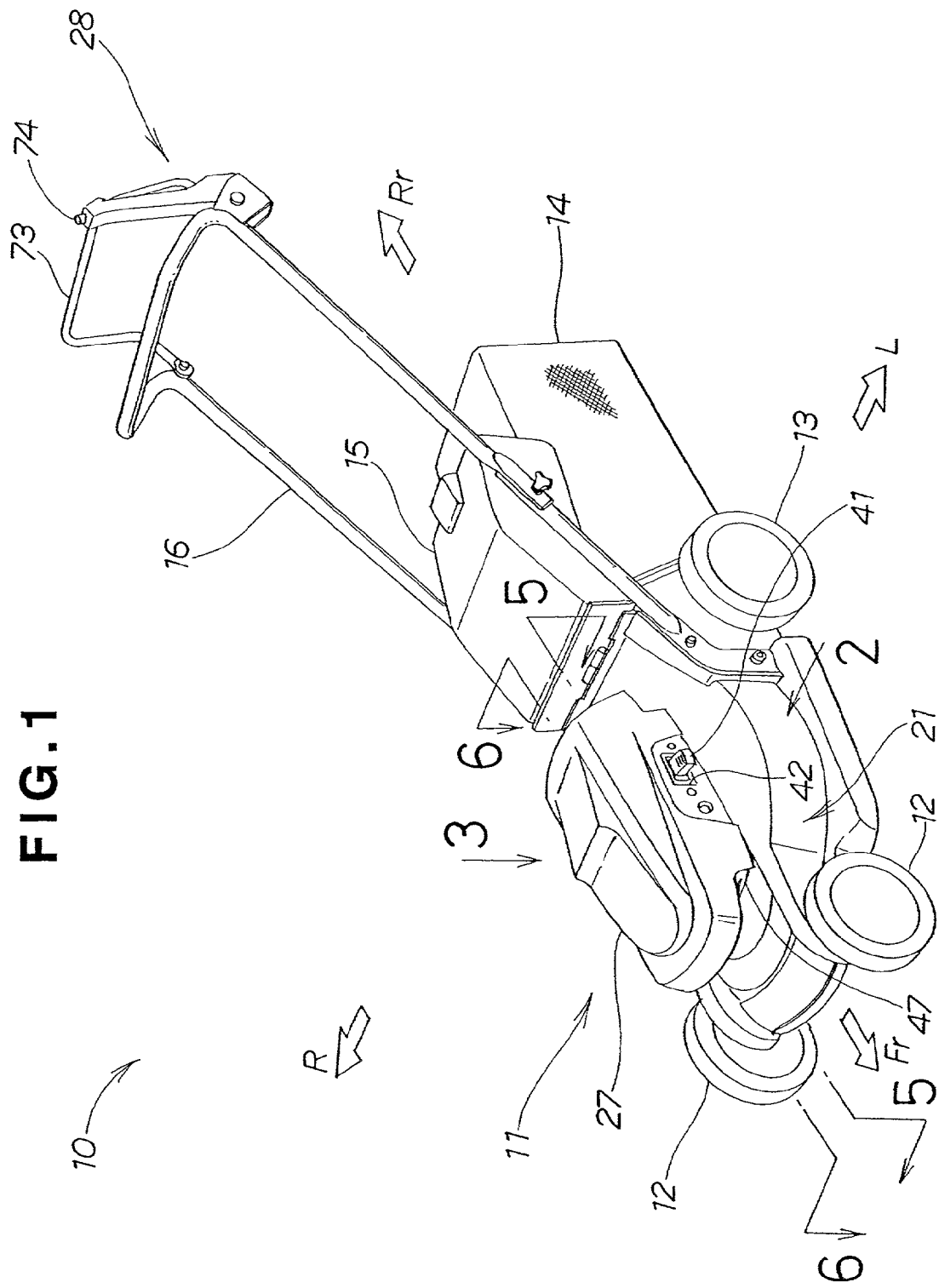
FIG. 1 is a perspective view of an electric lawn mower in accordance with an embodiment of the present invention.

Although the present invention will hereinbelow be described primarily as embodied as an electric lawn mower, it should be appreciated that the present invention may be embodied as another type of electric working machine.

In the following description, the terms "front", "rear", "left", "right", "upper" and "lower" denote directions as viewed from a human operator of an electric lawn mower or electric working machine. In the drawings, "Fr" indicates "front", "Rr" rear, "L" left, and "R" right.

FIG. 1 is a perspective view of an electric lawn mower in accordance with an embodiment of the present invention. The electric lawn mower 10 includes a machine body section 11, front wheels 12, rear wheels 13, a grass bag 14, a discharge port cover 15, a handle 16, a cutter housing 21, a covering 27, and a switch operation mechanism 28. The electric lawn mower 10 also includes a power on/off key (main key) 41 that functions as a connecting member or male plug for removable insertion into a relay member 42 functioning as a machine-side female socket or power switch, for turning on/off the lawn mower 10.

Figure 4:
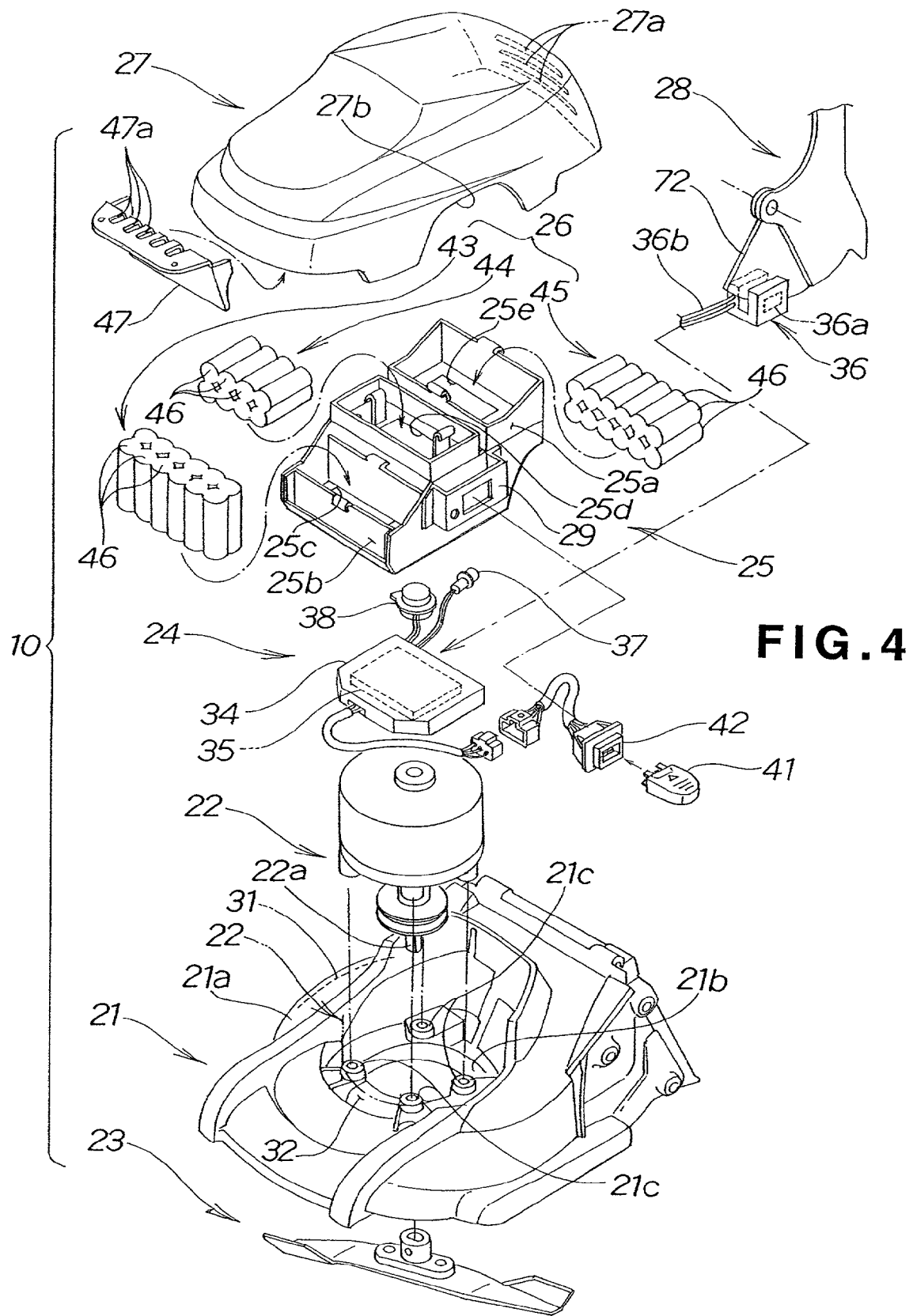
FIG. 4 is an exploded perspective view of the electric lawn mower of FIG. 1.

As seen from a combination of FIGS. 1 and 4, the switch operation mechanism 28 includes a noncontact reed switch 36 for performing ON/OFF control of an electric motor 22, a generally-fan-shaped actuating member 72 pivotally mounted on the handle 16 for setting an ON/OFF state of the reed switch 36, a handling lever 73 for causing the actuating member 72 to pivot and a clutch mechanism 74.

Importantly, the electric lawn mower 10 of the present invention is designed to permit cleaning of its scroll portion with enhanced efficiency and ease by having the scroll portion at one of left and right sides of the machine body section 11 and the machine-side female socket or power switch (i.e., relay member) 42 for removable insertion of the power on/off key 41 at the other side of the machine body section 11. Further, in the electric lawn mower 10, a motor-driving battery unit 26 and control section 24 can be electrically connected with each other by insertion, in the relay member 42, of the power on/off key 41 and disconnected from each other by removal, from the relay member 42, of the power on/off key 41. These important features will become clearer as the description proceeds.

Figure 2:
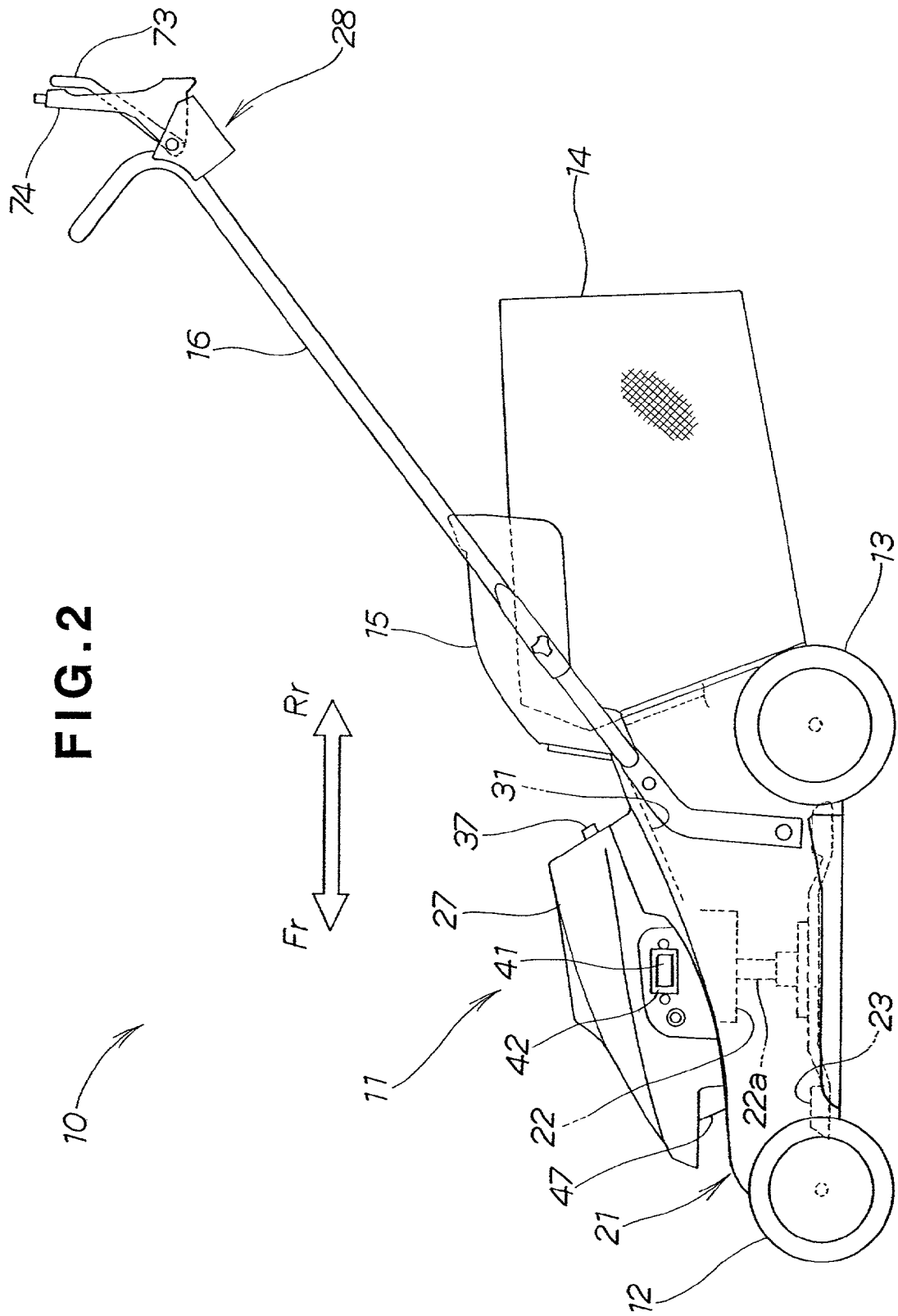
FIG. 2 is a side view of the electric lawn mower taken in a direction of arrow "2" of FIG. 1.

FIG. 2 is a side view of the electric lawn mower 10 taken in a direction of arrow "2" of FIG. 1. This electric lawn mower 10 is constructed as a rear-discharge type lawn mower. Namely, the electric motor 22 is turned on or off by the power on/off key 41 being inserted into or removed from the relay member (or machine-side power switch) 42 provided in the machine body section 11. Cutter blade 23 within the cutter housing 21 is rotated by the electric motor 22 to cut the grass, and resulting grass clippings are delivered, through the scroll portion 31 within the cutter housing 21, to a rear portion of the machine body section 11 so that the grass clippings are ultimately collected into the grass bag 14.

Figure 3:
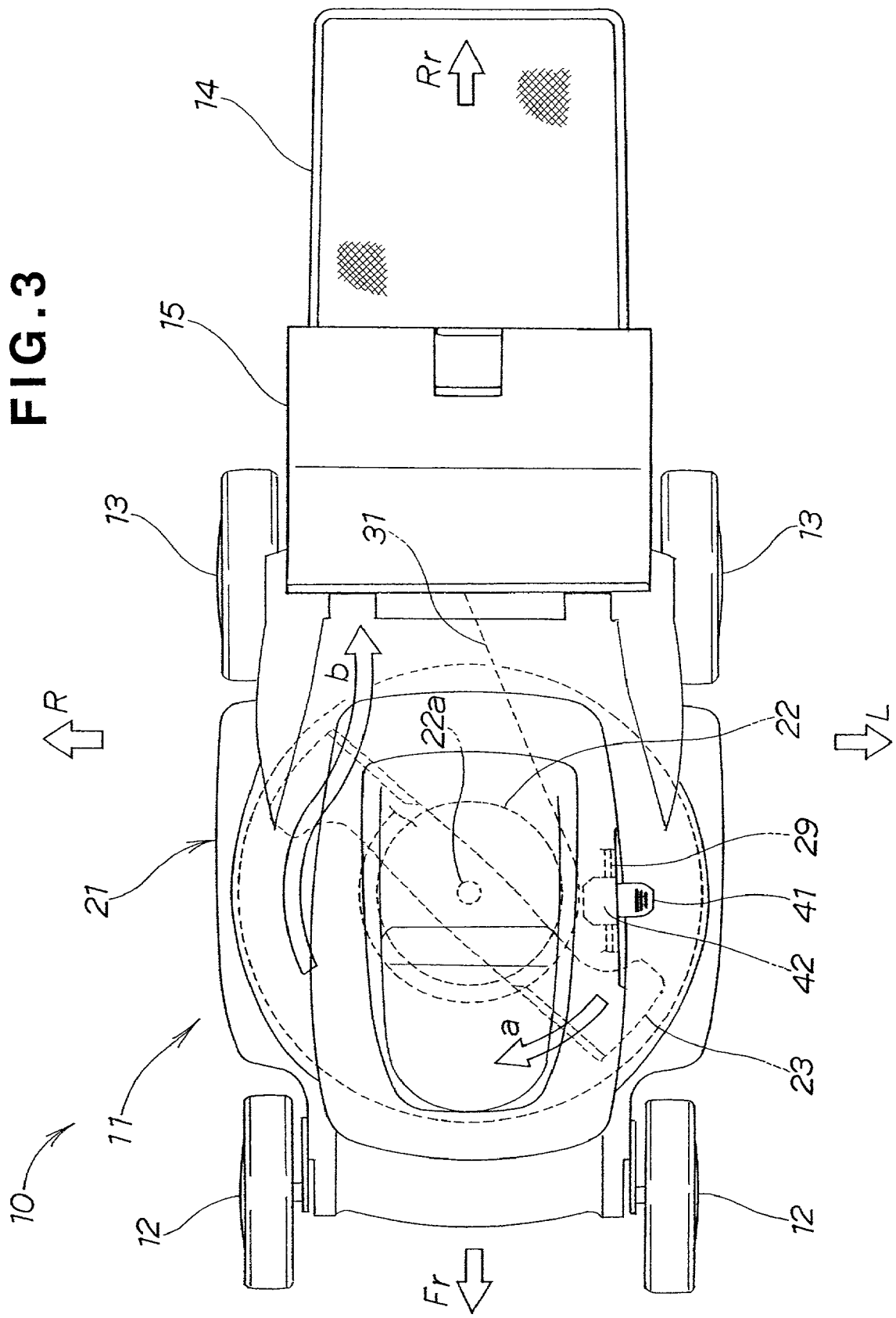
FIG. 3 is a plan view of the electric lawn mower taken in a direction of arrow "3" of FIG. 1.

FIG. 3 is a plan view of the electric lawn mower 10 taken in a direction of arrow "3" of FIG. 1. Inserting the power on/off key 41 in the relay member 42 turns on the electric motor 22 via the switch operation mechanism 28 shown in FIG. 1, so that the thus-activated motor 22 rotates the cutter blade 23 as denoted by arrow "a" to cut the grass. The resulting grass clippings are driven, by vortexes produced by the rotating cutter blade 23, into the grass bag 14 through the scroll portion 31 of the cutter housing 21, as denoted by arrow "b". Namely, in this rear-discharge-type electric lawn mower 10, the scroll portion 31 is disposed at one of left or right sides of the machine body section 11 while the relay member 42 for removable insertion therein of the power on/off key 41 is disposed at the other of the left or right sides of the machine body section 11.

Generally, in the rear-discharge-type electric lawn mowers where grass clippings are delivered, through the scroll portion, to a rear portion of the machine body section to be ultimately collected into the grass bag, there arises a need to clean the scroll portion from time to time because the grass clippings tend to adhere to the surface of the scroll portion; thus, it is preferable that the electric lawn mowers be constructed in such a manner as to facilitate the cleaning of the scroll portion.

This is why the scroll portion 31 in the instant embodiment is provided at one of the left or right lateral sides of the machine body section 11 while the relay member 42 is provided at the other of the left or right lateral sides via a mounting bracket 29. With this arrangement, the human operator can easily clean the scroll portion 31 after he or she first pulls out the power on/off key 41 from the relay member 42 on the other side of the body section 11 and then lays the machine body section 12 down sideways with the one side (scroll-portion side) facing downward. That is, the human operator can attend to the removal of the power on/off key 41 and sideways laying-down of the machine body section 12 from a same operating position, so that the efficiency and ease in the cleaning operations can be greatly enhanced.

The following paragraphs detail the construction of the rear-discharge-type electric lawn mower 10 of the present invention.

FIG. 4 is an exploded perspective view of the electric lawn mower 10, which shows principal components of the lawn mower 10. As shown, the electric motor 22 is mounted in on the cutter housing 21, the cutter blade 23 is connected to a rotation shaft 22a of the motor 22, and the control section 24 is disposed above the motor 22. The electric lawn mower 10 also includes a battery bracket 25 attached to the cutter housing 21 from above the motor 22 and control section 24, and the battery unit 26 supported on the battery bracket 25. The covering 27 collectively covers the electric motor 22, control section 24, battery bracket 25 and battery unit 26, and the electric motor 22 is controlled to be turned ON or OFF via the switch operation mechanism 28. Preferably, the battery bracket 25 is secured to the cutter housing 21 at the same time that the motor 22 is secured to the cutter housing 21.

The cutter housing 21 has a relatively large upward opening 21b receiving therein a bottom portion of the motor 22, and a plurality of bosses 21c by which the motor 22 is fixed to the body 21a of the cutter housing 21. The housing body 21a has the scroll portion 31 formed therein for delivering the grass clippings to the rear grass bag 14 while simultaneously permitting the rotation of the cutter blade 23. With the electric motor 22 mounted by means of the cutter housing bosses 21c, there are formed communicating holes 32 (only one of which is shown in FIG. 4) communicating between the interior and exterior of the cutter housing 21.

The control section 24 includes a casing 34 and a control board 35 accommodated in the casing 34. The control board 35 is coupled with the above-mentioned noncontact reed switch 36 that constitutes an important part of the switch operation mechanism 28 for controlling the motor 22. To the control board 35 is also connected a display lamp 37 for being normally illuminated to inform the human operator that the electric lawn mower 10 is in operable condition, as well as a buzzer 38 that keeps sounding while the machine body section 11 is traveling or performing any of various operations. The control section 24 also includes the above-mentioned power on/off key 41 and relay member 42 cooperating to power on the lawn mower 10. Note that the relay member 42 functions also as a connector for recharging the battery unit 26 as will be later described.

The battery bracket 25, which is preferably made of a metal material, includes a body portion 25a that covers the sides and top of the electric motor 22, a forward extension 25b extending horizontally forward from the body portion 25a, and the mounting bracket 29 to which the relay member 42 is fitted. The battery bracket 25 is secured to the cutter housing 21 along with the motor 22, as stated earlier. The body portion 25a has air vents 25c and 25d, and the forward extension 25b has an air vent 25e.

As stated above, the electric lawn mower 10 of the present invention has the battery bracket 25 and electric motor 22 secured together to the cutter housing 21. Thus, it is possible to assemble the electric lawn mower 10 with enhanced efficiency.

The battery unit 26, which is mounted on an upper portion of the cutter housing 21 and preferably a nickel-cadmium battery unit, comprises a front battery 43 and first and second upper batteries 44 and 45. The front battery 43 comprises a group of electric cells 46 each having a rated voltage of 1.2 V, and this front battery 43 is mounted on the forward extension 25b of the battery bracket 25 with each of the cells placed in an upright position. The first and second upper batteries 44 and 45 each comprise a group of electric cells 46 each having a rated voltage of 1.2 V similarly to the front battery 43, and these upper batteries 44 and 45 are mounted on the body portion 25a of the battery bracket 25 with each of the cells placed in a horizontal position.

The battery unit 26 may comprise other high-performance batteries than the nickel-cadmium batteries, such as other types of nickel- or lithium-based batteries. It is generally known that the temperature of the nickel- or lithium-based batteries can be controlled relatively easily during recharging operations. Thus, in the instant embodiment, the battery unit 26 comprising such nickel- or lithium-based batteries can be recharged with significantly improved efficiency.

The covering 27, which is preferably made of resin, includes a louver 47 provided on its lower front portion and having openings 47a for air currents to and from the interior of the covering 27. The covering 27 also has air vents 27a formed in its rear end portion and a recess 27b in its left side for allowing the relay member 42 to open to the outside.

Figure 5:
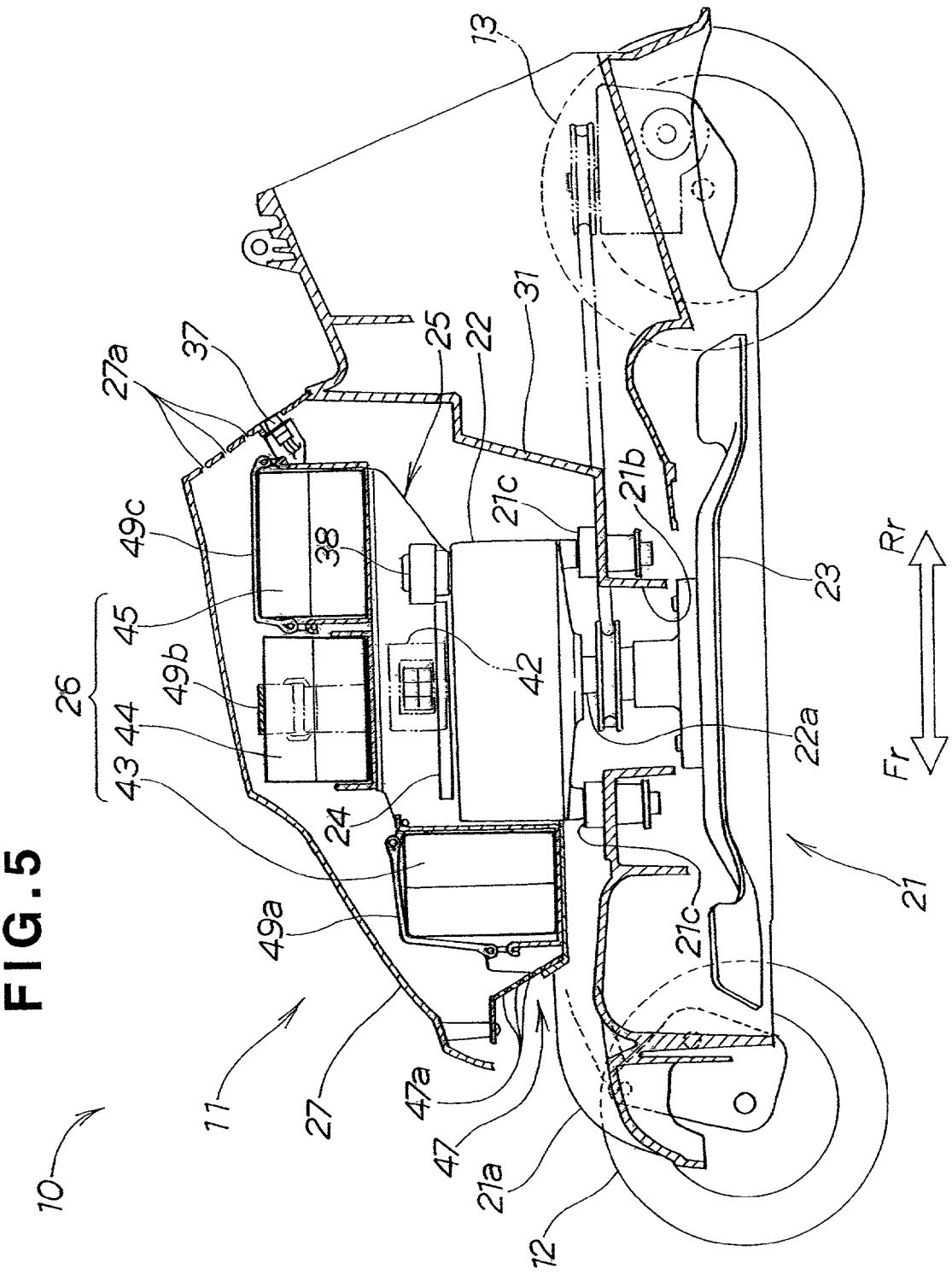
FIG. 5 is a sectional side view of the electric lawn mower taken alone the 5-5 line of FIG. 1.

FIG. 5 is a sectional side view of the electric lawn mower 10 taken alone the 5-5 line of FIG. 1. FIG. 5 clearly shows that, in the electric lawn mower 10 where the cutter blade 23 is enclosed in the cutter housing 21, the electric motor 22 is mounted on the upper portion of the cutter housing 21 and the motor 22 is driven via the rechargeable battery unit 26, the battery unit 26 comprises the first and second upper batteries 44 and 45 positioned above the motor 22 and the front battery 43 positioned in front of the motor 22. With the batteries 44 and 45 thus positioned above the motor 22 and the battery 43 positioned in front of the motor 22, it is possible to achieve appropriate weight balance of the electric lawn mower 10, which can thereby greatly improve operability of the electric lawn mower 10.

Further, in the electric lawn mower 10 where the rechargeable battery unit 26 is mounted in the machine body section 11 for driving the electric motor 22 to rotate the cutter blade 23 within the cutter housing 21, the motor 22 and battery unit 26 are covered collectively with the covering 27, the covering 27 has a front half portion shaped to progressively slant upward in the front-to-rear direction of the mower 10, the louver openings 47a is formed in its lower front portion, and the air vents 27a is formed in its upper rear portion. Thus, the battery unit 26 and motor 22 can be effectively cooled by external cool air being introduced into the covering 27 through the front louver openings 47a and discharged out of the covering 27 through the rear air vents 27a. This arrangement can effectively prevent the battery unit 26 and motor 22 from overheating, which thereby allows the electric lawn mower 10 to withstand long-time continuous operation or use.

Figure 6:
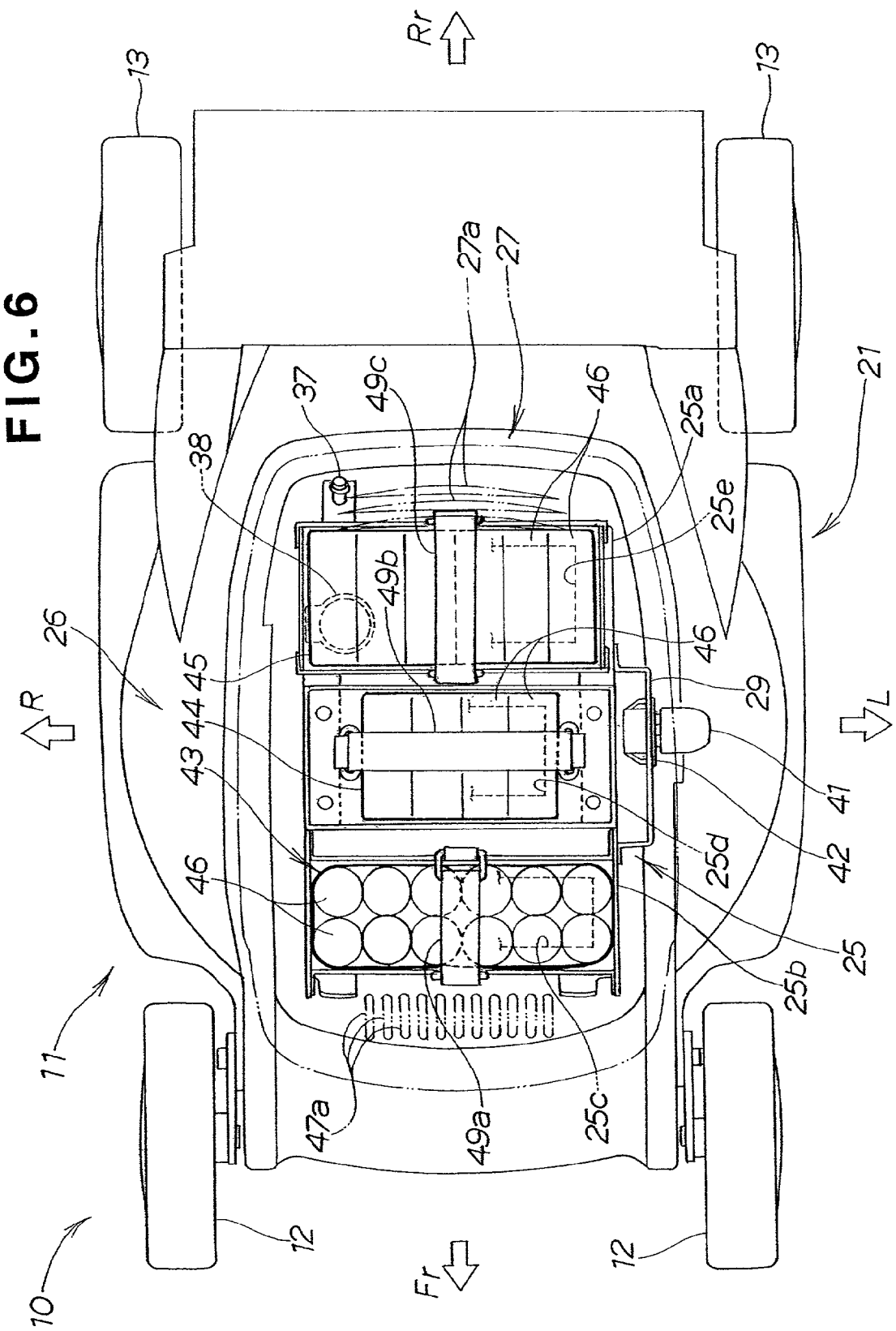
FIG. 6 is a sectional view of the electric lawn mower taken alone the 6-6 line of FIG. 1.

FIG. 6 is a sectional view of the electric lawn mower 10 taken alone the 6-6 line of FIG. 1, which shows the mower 10 with the covering 27 (see FIG. 5) removed for clarity. This figure clearly shows that the cutter housing 21 has fixed thereto the battery bracket 25 including the body portion 25a covering the sides and top of the electric motor 22 and the forward extension 25b extending forward from the body portion 25a, and that the first and second upper batteries 44 and 45 and the front battery 43 are mounted on the body portion 25a and extension 25b, respectively, in a distributed fashion. Such distributed arrangement of the batteries 43, 44 and 45 allows cool air to easily flow among the batteries 43, 44 and 45 and electric motor 22, and thereby promotes heat radiation from the batteries 43, 44 and 45 and motor 22.

Further, because the battery bracket 25 is made of a metal material and has the air vents 25c, 25d and 25e formed where the batteries 43, 44 and 45 are mounted, it is possible to even further promote heat radiation from the batteries 43, 44 and 45 and motor 22. Note that reference numerals 49a, 49b and 49c represent elastic belts that fasten the batteries 43, 44 and 45 to the battery bracket 25.

Figure 7:
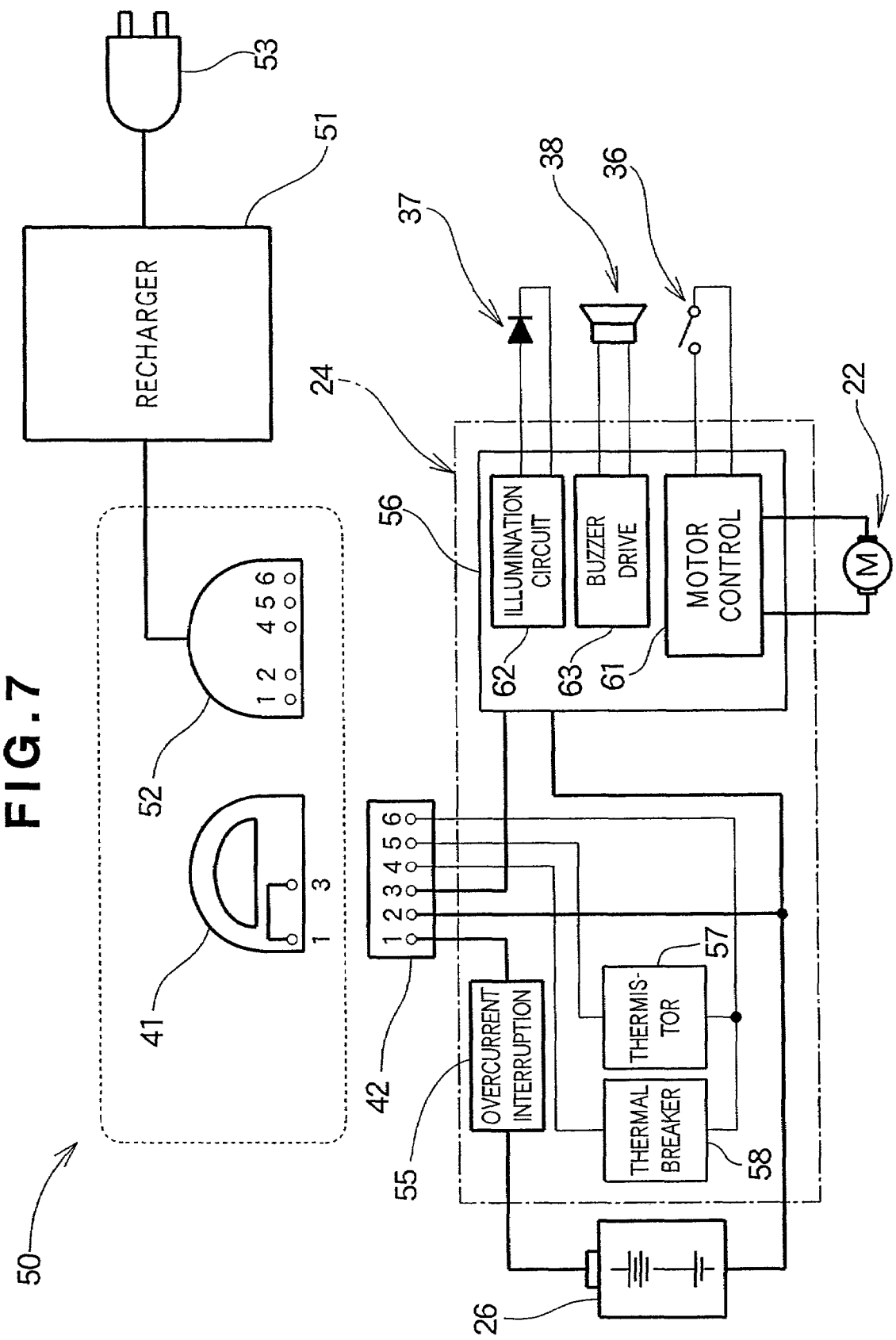
FIG. 7 is a hardware block diagram showing a control system of the electric lawn mower of FIG. 1.

FIG. 7 is a block diagram showing a control system of the electric lawn mower 10 described above in relation to FIGS. 1-6. The control system 50 generally comprises the above-described control section 24 for controlling the electric motor 22, and a recharger 51 for recharging the battery unit 26.

As shown in FIG. 7, the control section 24 includes an overcurrent interruption circuit 55 for interrupting an overcurrent, a control block 56 for controlling behavior of the electric lawn mower 10, a thermistor 57 for monitoring the temperature of the battery unit 26 during the recharge, and a thermal breaker 58 for terminating the recharge on the basis of an output signal from the thermistor 57. The control section 24 also includes the above-described relay member 42 into which either the power on/off key 41 or the plug of the recharger 51 can be selectively inserted as necessary.

The control section 24 constantly monitors, by means of the thermistor 57, the temperature of the battery unit 26 during the recharge; namely, the control section 24 has a function of monitoring and controlling the temperature of the battery unit 26. By the control section 24 having such a battery-temperature controlling function, the battery unit 26 can be recharged with enhanced reliability, as a result of which the battery unit 26 can have prolonged operating life.

The control block 56 includes a motor control circuit 61 for controlling operation of the electric motor 22, an illumination circuit 62 for illuminating the above-mentioned display lamp 37 preferably in the form of a light-emitting diode (LED), and a buzzer drive circuit 63 for driving the buzzer 38. To the motor control circuit 61 is connected the noncontact reed switch 36 of the switch operation mechanism 28 (FIG. 4) for turning on/off the electric motor 22. The illumination circuit 62 keeps illuminating the display lamp 37 as long as the voltage of the battery unit 26 is higher than a predetermined voltage level immediately above a later-described memory-effect inducing voltage level, but deilluminates (turns off) the display lamp 37 once the voltage of the battery unit 26 falls below the predetermined voltage level. Specifically, the illumination circuit 62 keeps illuminating the display lamp 37 except when the voltage of the battery unit 26 is lower than the predetermined voltage level of, for example, 0.97 volts/cell.

By the provision of the display lamp 37 thus kept illuminated while the voltage of the battery unit 26 is exceeding the predetermined voltage level immediately above the memory-effect inducing voltage level, the human operator may safely continue mowing as long as the display lamp 37 is illuminated and stop mowing once the display lamp 37 is turned off. Namely, the display lamp 37 can inform the human operator of appropriate timing to recharge the battery unit 26. As a consequence, it is possible to prevent the operating life of the battery unit 26 from being improperly shortened.

The buzzer drive circuit 63 causes the buzzer 38 to keep sounding as long as the electric motor 22 is rotating, but to stop sounding once the voltage of the battery unit 26 falls below a predetermined voltage level. Namely, in the electric lawn mower 10 of the invention which includes the rechargeable battery unit 26 mounted in the machine body section 11 and which causes the machine body section 11 to travel and perform any of various operations using the battery unit 26 as the driving source for the motor 22, the buzzer 38 can inform the human operator that the electric lawn mower 10 is currently in the actual operating state.

Generally, the motor-driven electric lawn mowers driven by the electric motor can operate with noise much lower than the engine-driven lawnmowers. Thus, where such an electric lawnmower is used in a large noise environment, a human operator may not be able to easily judge, through his or her hearing, whether or not the electric lawn mower is currently in the actual operating state. Thus, by the provision of the buzzer 38 that keeps sounding while the electric motor 22 is rotating to cause the machine body section 11 to travel or perform any of various operations and thereby informs the human operator that the electric lawn mower 10 is currently in the actual operating state, the working efficiency and operability of the lawn mower 10 can be improved.

Further, because the buzzer 38 in the instant embodiment is automatically deactivated when the voltage of the battery unit 26 falls below the predetermined voltage level, it is possible to avoid wasteful power consumption of the battery unit 26.

The above-mentioned relay member 42 is a connector having six connection terminals C1-C6 (denoted simply as "1"-"6" in the figure due to a limited space), of which the first connection terminal C1 functioning as a positive terminal is connected with the positive pole of the battery unit 26 via the overcurrent interruption circuit 55, the second connection terminal C2 connected with the negative pole of the battery unit 26 and one of two input terminals of the control block 56, the third connection terminal C3 connected to the other input terminal of the control block 56, the fourth connection terminal C4 connected with an end of the thermal breaker 58, the fifth connection terminal C5 connected with an end of the thermistor 57 and the sixth connection terminal C6 connected with the respective other ends of the thermal breaker 58 and thermistor 57.

The power on/off key 41 is in the form of a male plug having a pair of electrically connected pins P1 and P3 (denoted simply as "1" and "3" in the figure due to a limited space), which are inserted into the relay member 42 and connected to the first and third connection terminals C1 and C3, respectively, of the relay member 42 to thereby short-circuit between the terminals C1 and C3.

The recharger 51 includes the charging plug 52 for connection to the relay member 42 and a power supply plug 53 for connection to the AC line. The charging plug 52 for recharging the battery unit 26 has pins R1, R2, R4, R5 and R6 (denoted simply as "1", "2", "4", "5" and "6" in the figure due to a limited space) for connection to the first, second, fourth, fifth and sixth connection terminals C1, C2, C4, C5 and C6, respectively, of the relay member 42.

From the foregoing, it should be apparent that the relay member 42 is a connector to which either the power on/off key 41 or the charging plug 52 of the recharger 51 is selectively connectable as necessary. In other words, the same relay member 42 in the electric lawn mower 10 is compatibly connectable with the recharger 51 for recharging the battery unit 26 as well as with the power on/off key 41; that is, the same relay member 42 has two separate connection portions integrally provided thereon, one for connection with the power on/off key 41 and the other for connection with the recharger 51. Thus, the power on/off key 41 can be inserted and connected to the relay member 42 when the electric lawn mower 10 is to operate for the grass cutting purposes, while the recharger 51 can be inserted and connected to the relay member 42 when the battery unit 26 is to be recharged. Thus, it is possible to reliably avoid mis-insertion or mis-connection of the power on/off key 41 or recharger 51. As a result, the electric lawn mower 10 can work with increased convenience and efficiency during the discharge (i.e., grass cutting operations) or recharge of the battery unit 26.

More specifically, in the electric lawn mower 10, the positive connection terminal C1 of the relay member 42, which is directly connected with the positive pole of the battery unit 26, also functions as a recharging positive terminal for connecting the recharger 51 to the positive pole of the battery unit 26. With the positive connection terminal C1 of the relay member 42 thus functioning also as the recharging positive terminal connectable with the positive pole of the battery unit 26, it is possible to simplify the construction of the control section 24 and relay member 42. As a result, the necessary overall cost of the electric lawn mower 10 can be reduced to a considerable degree.

Further, in the electric lawn mower 10 of the invention which includes the rechargeable battery unit 26 mounted in the machine body section 11 and which causes the machine body section 11 to travel and perform any of various operations using the battery unit 26 as the driving source, the relay member 42 is provided for operative connection between the control section 24 and the battery unit 26, and the connecting member (power on/off key) 41 is inserted into the relay member 42 to connect the control section 24 and battery unit 26. Further, removing the connecting member (power on/off key) 41 from the relay member 42 can completely disconnect the control section 24 from the battery unit 26. Such an arrangement can minimize unnecessary electrical discharge from the battery unit 26 during a non-operating or quiescent period of the electric lawn mower 10, and prevent overdischarge during long-time storage of the electric lawn mower 10. As a result, the battery unit 26 can have even longer operating life.

Figure 8:
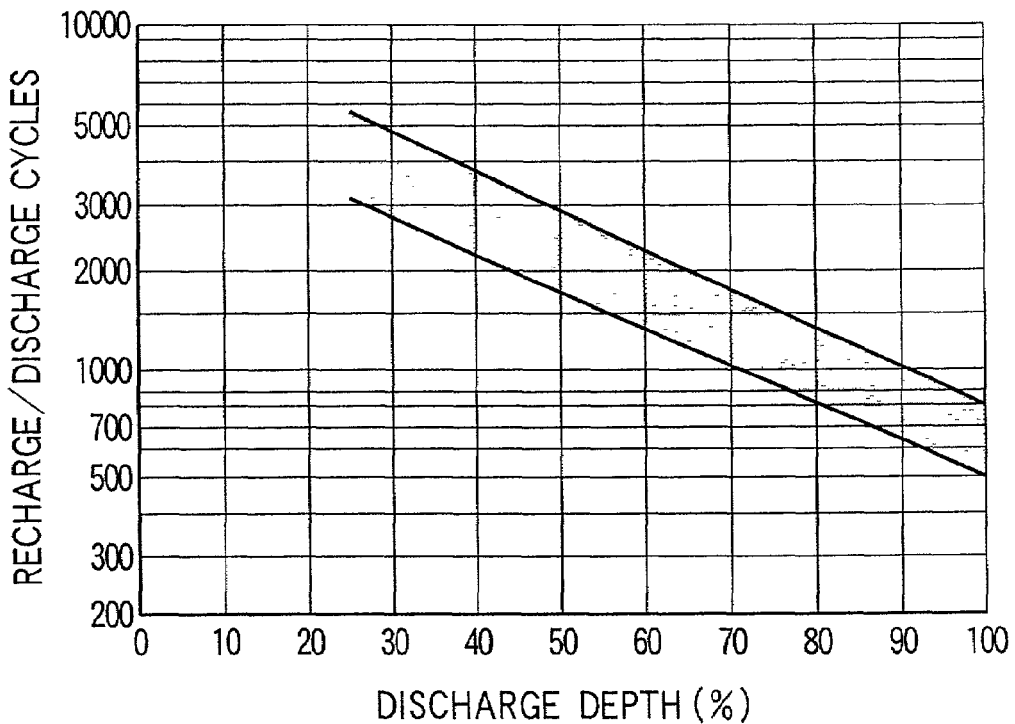
FIG. 8 is a graph explanatory of operating life characteristics of a battery unit employed in the electric lawn mower of FIG. 1.

FIG. 8 is a graph explanatory of operating life characteristics of the battery unit 26 employed in the electric lawn mower 10 of the invention, where the horizontal axis represents a variation in the discharge depth (%) while the vertical axis represents a variation in the number of recharge/discharge cycles. Here, the "discharge depth" means a depth of electrical discharge from the battery unit 26 and is expressed by the percentage; let it be assumed that when the battery unit 26 having a capacity of "100" (provisional value) is completely discharged, the discharge depth is expressed as "100%". The "number of recharge/discharge cycles" means a total number of times the battery unit 26 can be recharged and discharged. As known in the art, the nickel-cadmium battery can restore the capacity even after it has been completely discharged and is thus more tolerant of overdischarge than lead-based or other types of batteries. However, repetition of complete discharge would undesirably lead to shortened operating life of the battery. For example, if the complete discharge of 100% depth is repeated, the number of recharge/discharge cycles is limited to a range of 500 to 800, while if 50%-depth discharge is repeated, the number of recharge/discharge cycles can increase up to a range of 1,700 to 1,800, as illustratively shown in FIG. 8.

Figure 9:
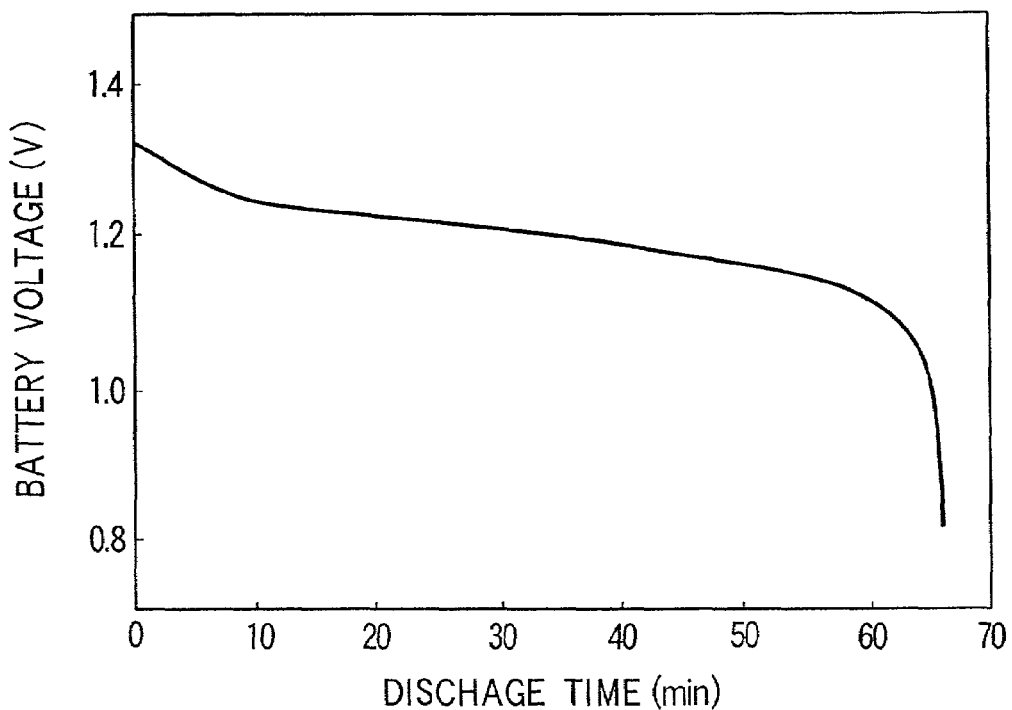
FIG. 9 is a graph explanatory of a memory effect of the battery unit in the electric lawn mower.

FIG. 9 is a graph explanatory of the memory effect of the battery unit 26 employed in the electric lawn mower 10 of the invention, where the horizontal axis represents a variation in the discharge time (min.) while the vertical axis represents a variation in the battery voltage (V). As known in the art, if deep discharge is effected after repetition of shallow discharge, the nickel-cadmium battery would present two-stage voltage drops during the deep discharge, and such a phenomenon is referred to as the memory effect. In the illustrated example, the battery voltage falls slowly from 1.3 V to 1.1 V in a first 60 min. period from the beginning of the discharge. However, after the first 60 min. period elapses, there occurs a rapid drop in the battery voltage.

From the graphs of FIGS. 8 and 9, it can be seen that care must be taken 1) to not repeat complete discharge and 2) to not repeat only shallow discharge that tends to cause the memory effect. Namely, it is desirable that the recharge/discharge be performed with appropriate depth. Having empirically estimated that the memory-effect inducing voltage level is 1.1 volts/cell in the case of the battery having the rated voltage of 1.2 V, the electric lawn mower 10 of the invention is provided with the display lamp 37 (FIG. 5) that is kept illuminated until the battery voltage drops below 9.7 volts/cell with a view to setting the memory-effect inducing voltage level to less than 1.1 volts/cell.

Namely, the electric lawn mower 10 is provided with such a display lamp 37 that is kept illuminated as long as the voltage of the battery unit 26 exceeds the predetermined voltage level immediately above the memory-effect inducing voltage level. With the thus-operating display lamp 37, it is possible to properly indicate to the human operator when the battery unit 26 is to be recharged, to thereby prevent the operating life of the battery unit 26 from being shortened due to improper recharge.

The following paragraphs describe an example of a heat radiation mechanism employed in the above-described electric lawn mower 10.

Figure 10A:
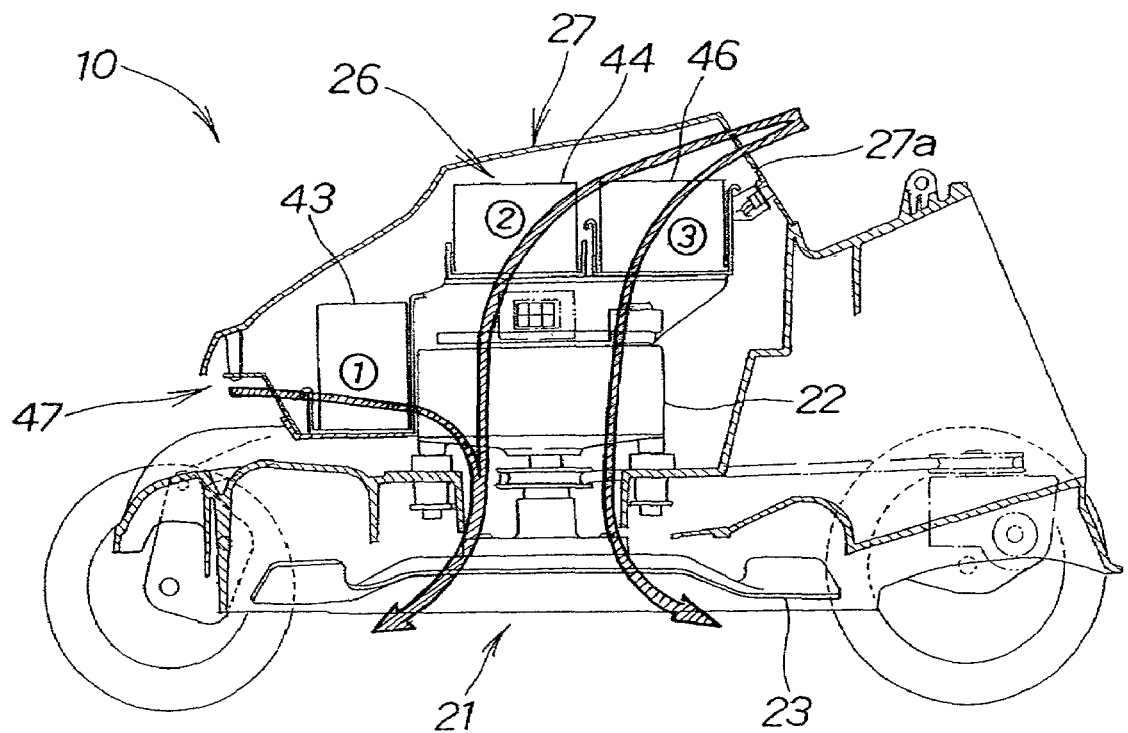
FIGS. 10A and 10B are views explanatory of behavior of the electric lawn mower.
Figure 10B:
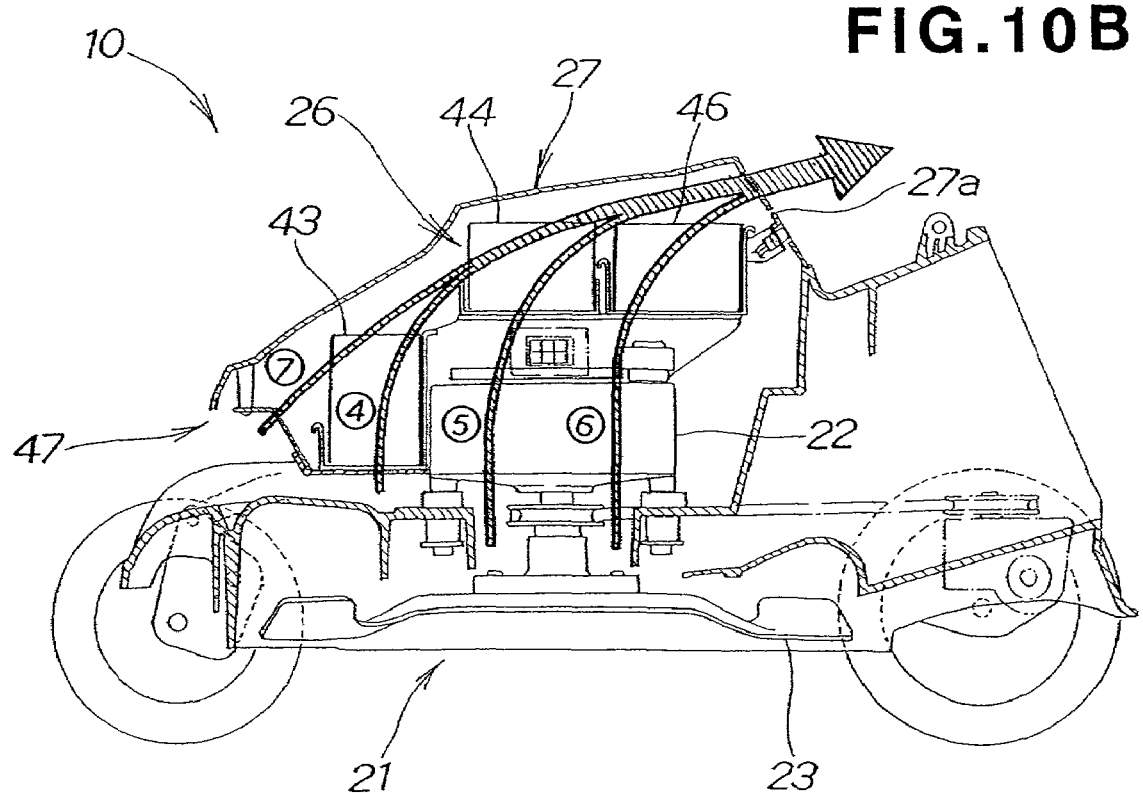

FIGS. 10A and 10B are views explanatory of behavior of the electric lawn mower 10, of which FIG. 10A shows flows of air through the lawn mower 10 while the lawn mower 10 is in operation and FIG. 10B shows flows of air through the lawn mower 10 immediately after the operation of the lawn mower 10 has been terminated. When the lawn mower 10 is in operation as shown in FIG. 10A, the rotating cutter blade 23 produces a negative pressure within the cutter housing 21. Thus, external air is drawn in through the louver openings 47a, (FIG. 4), passes along sides of the front battery 43 and flows into the cutter housing 21 through the communicating holes 32 (FIG. 4) formed beneath the motor 22, as denoted by arrow 1. In the meantime, external air is drawn in through the air vents 27a of the covering 27, passes along sides of the first and second upper batteries 44 and 45 and flows into the cutter housing 21 through the communicating holes 32, as denoted by arrow 2 and arrow 3. The air flows indicated by arrows 1-3 can compulsorily cool the front battery 43, first and second upper batteries 44 and 45 and electric motor 22.

Immediately after the electric lawn mower 10 is deactivated as shown in FIG. 10B, the front battery 43, first and second upper batteries 44 and 45 and electric motor 22 are in considerably heated condition. The heat can be radiated from the batteries 43, 44 and 45 and motor 22 by natural convection of the air introduced through the communicating holes 32 and passing around the batteries 43, 44 and 45 and motor 22 as denoted by arrows ④-⑥. Such air flows may cause other external air to be drawn in through the louver openings 47a (FIG. 4), pass around the batteries 43, 44 and 45 and motor 22 and escape through the air vents 27a of the covering 27, as denoted by arrow ⑦, so that further heat radiation of the batteries 43, 44 and 45 and motor 22 can be promoted.

Namely, in the electric lawn mower 10 where the cutter housing 21 has the communicating holes 32 communicating with the interior space defined by the covering 27, the rotating cutter blade 23 produces air flows from the louver openings 47a and air vents 27a into the cutter housing 21. When the cutter blade 23 is not rotating, on the other hand, reverse air flows are produced from within the cutter housing 21 to the air vents 27a by the heat of the front and upper batteries 43, 44 and 45 and motor 22.

The following paragraphs describe details of the power on/off key 41, relay member 42 and charging plug 52.

Figure 11:
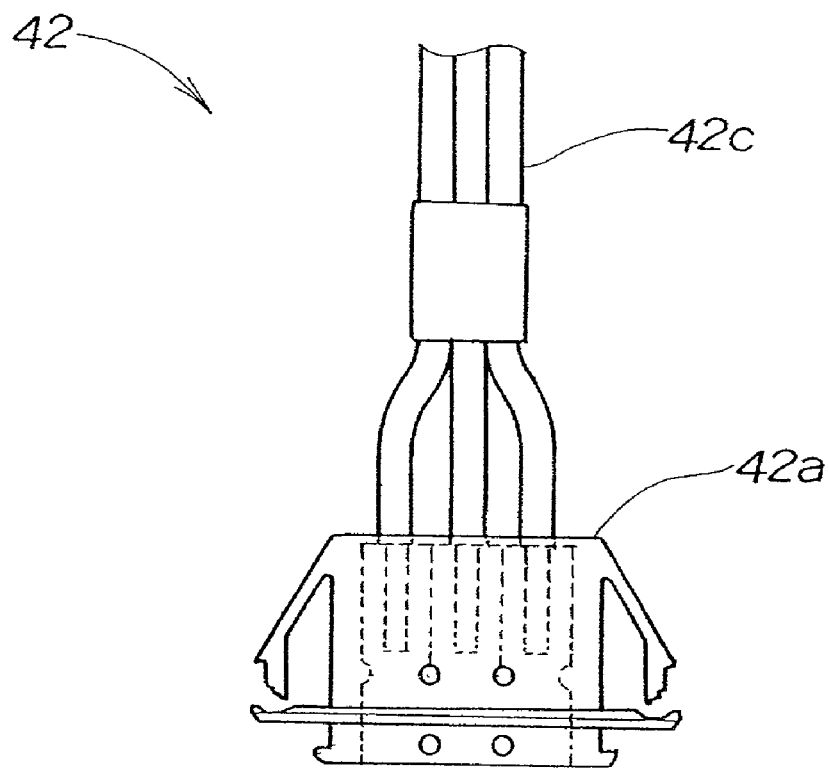
FIG. 11 is a plan view of a relay member employed in the electric lawn mower.
Figure 12:
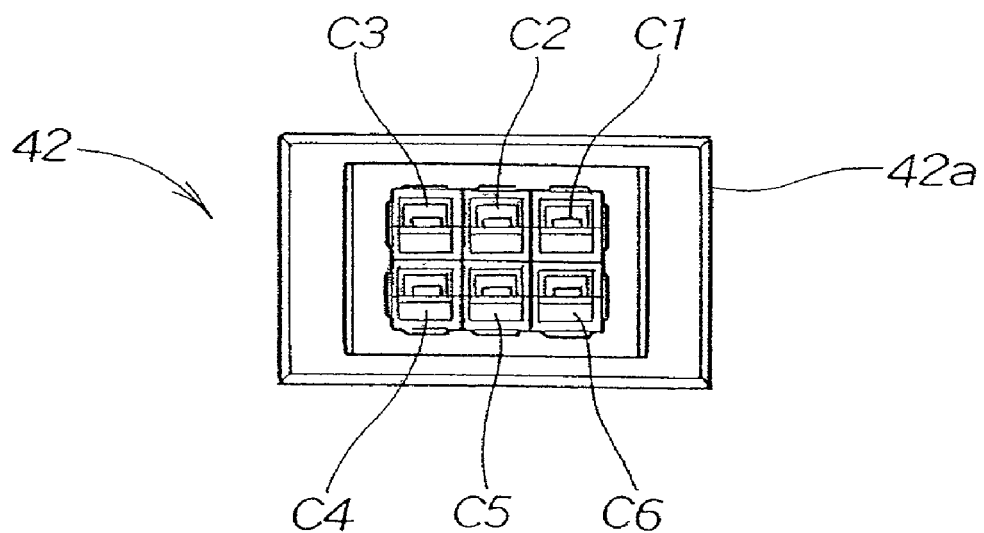
FIG. 12 is a front view of the relay member.

FIG. 11 is a plan view of the relay member 42 employed in the electric lawn mower of the present invention, and FIG. 12 is a front view of the relay member 42. The relay member 42 includes a housing 42a, the above-described six connection terminals C1 to C6 received within the housing 42a, and a harness 42c extending from the terminals C1 to C6. As shown in FIG. 12, the terminals C1 to C6 are arranged counterclockwise in order of ascending terminal numbers starting at an upper right position of the figure. These terminals C1 to C6 are connected via the harness 42c to the control board 35 of the control section 24 as described earlier in relation to FIG. 7.

Figure 13:
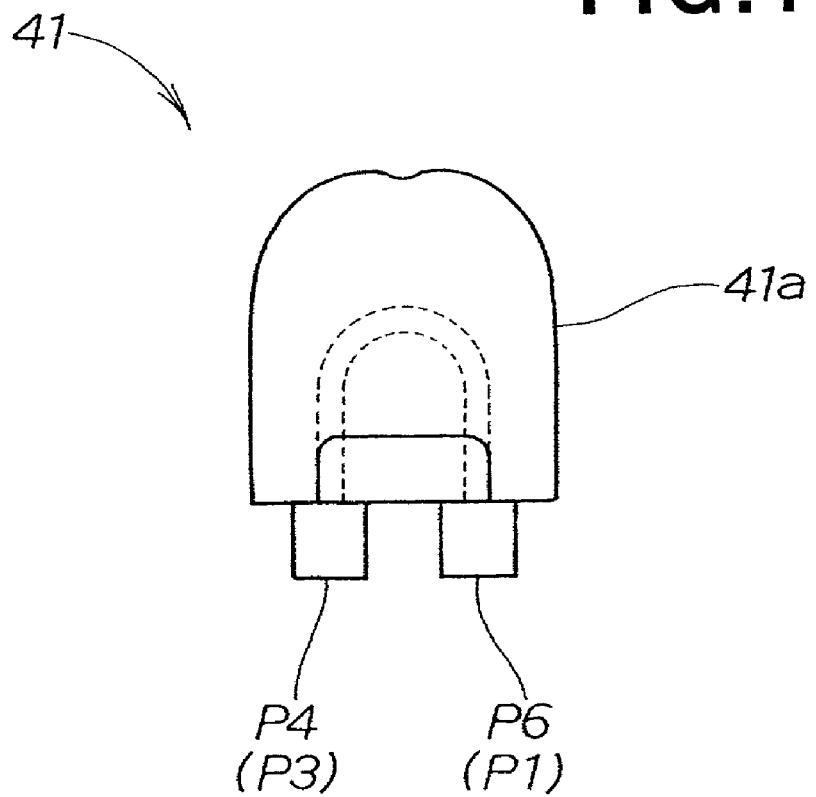
FIG. 13 is a plan view of a power on/off key employed in the electric lawn mower.
Figure 14:
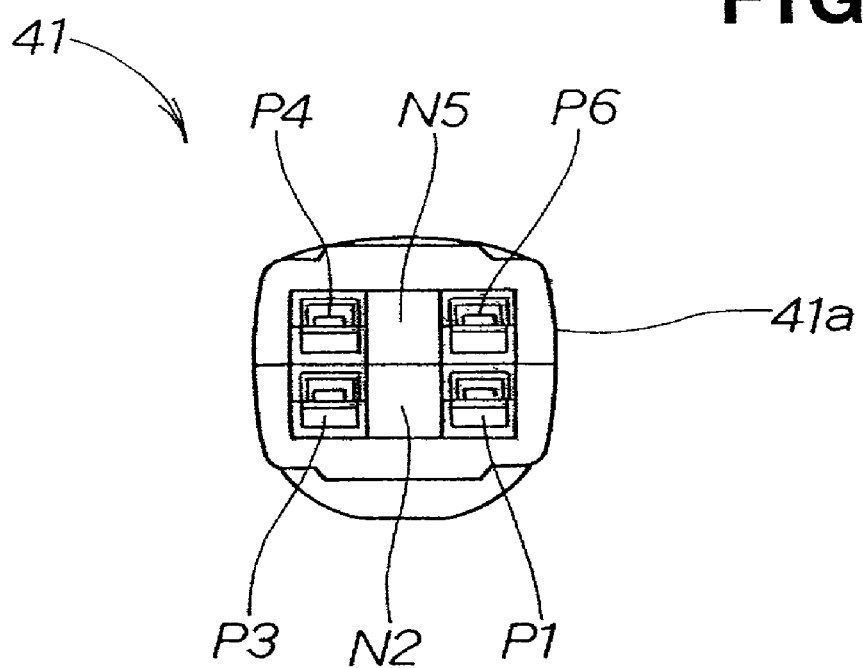
FIG. 14 is a front view of the power on/off key.

FIG. 13 is a plan view of the power on/off key 41 employed in the electric lawn mower of the present invention, and FIG. 14 is a front view of the power on/off key 41. The power on/off key 41 includes a housing 41a, and four connection pins P1, P3, P4 and P6 disposed within the housing 41a for connection with the connection terminals C1, C3, C4 and C6, respectively, of the relay member 42. As shown in FIG. 14, the pins P1, P3, P4 and P6 are arranged clockwise in order of ascending pin numbers starting at a lower right position of the figure. Positions N2 and N5 of the power on/off key 41 corresponding to the terminals C2 and C5 of the relay member 42 (see FIG. 12) are each an empty position devoid of such a connection pin. Further, the first and third connection pins P1 and P3 are short-circuited within the housing 41a, and the fourth and sixth connection pins P4 and P6 are dummy pins.

Figure 15:
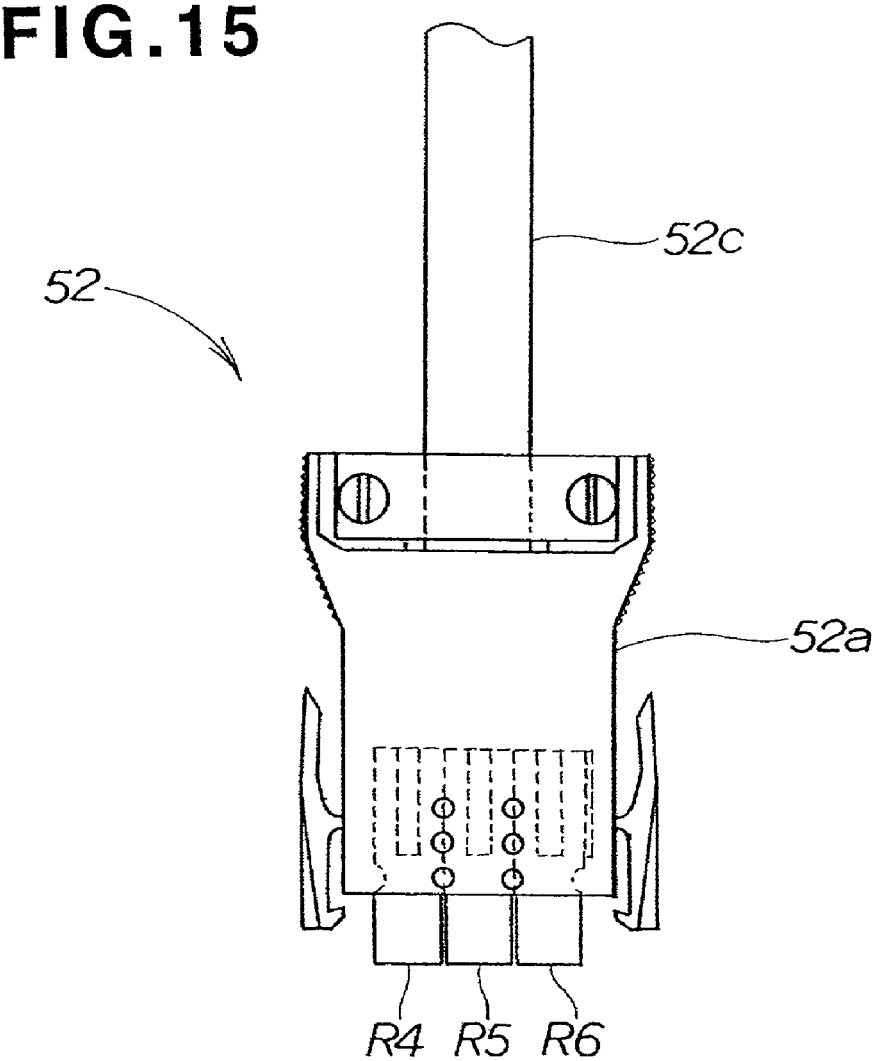
FIG. 15 is a plan view of a charging plug of a recharger for use in the electric lawn mower.
Figure 16:
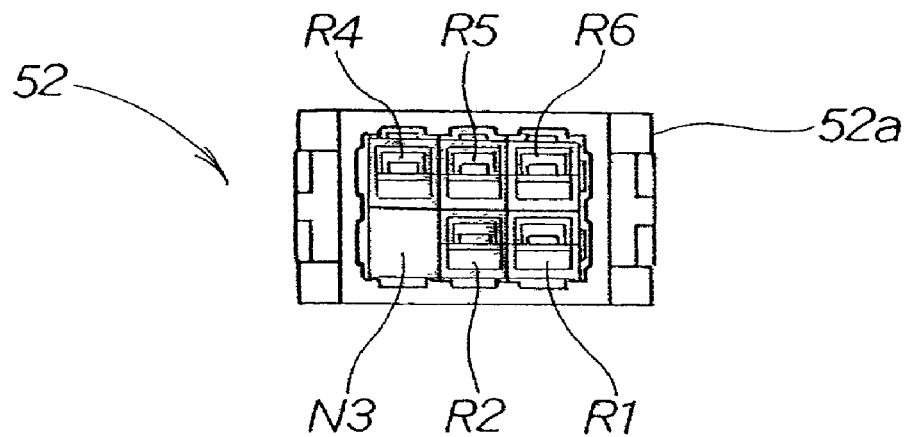
FIG. 16 is a front view of the charging plug of the recharger.

FIG. 15 is a plan view of the charging plug 52 employed in the electric lawn mower of the present invention, and FIG. 16 is a front view of the charging plug 52. The charging plug 52 includes a housing 52a, five connection pins R1, R2, R4, R5 and R6 disposed within the housing 52a for connection with the connection terminals C1, C2, C4, C5 and C6, respectively, of the relay member 42, and a harness 52c extending from the connection pins R1, R2, R4, R5 and R6. As shown in FIG. 16, the pins R1, R2, R4, R5 and R6 are arranged clockwise in order of ascending pin numbers starting at a lower right position of the figure. Position N3 of the charging plug 52 corresponding to the terminal C3 of the relay member 42 (see FIG. 12) is an empty position devoid of such a connection pin.

Figure 17:
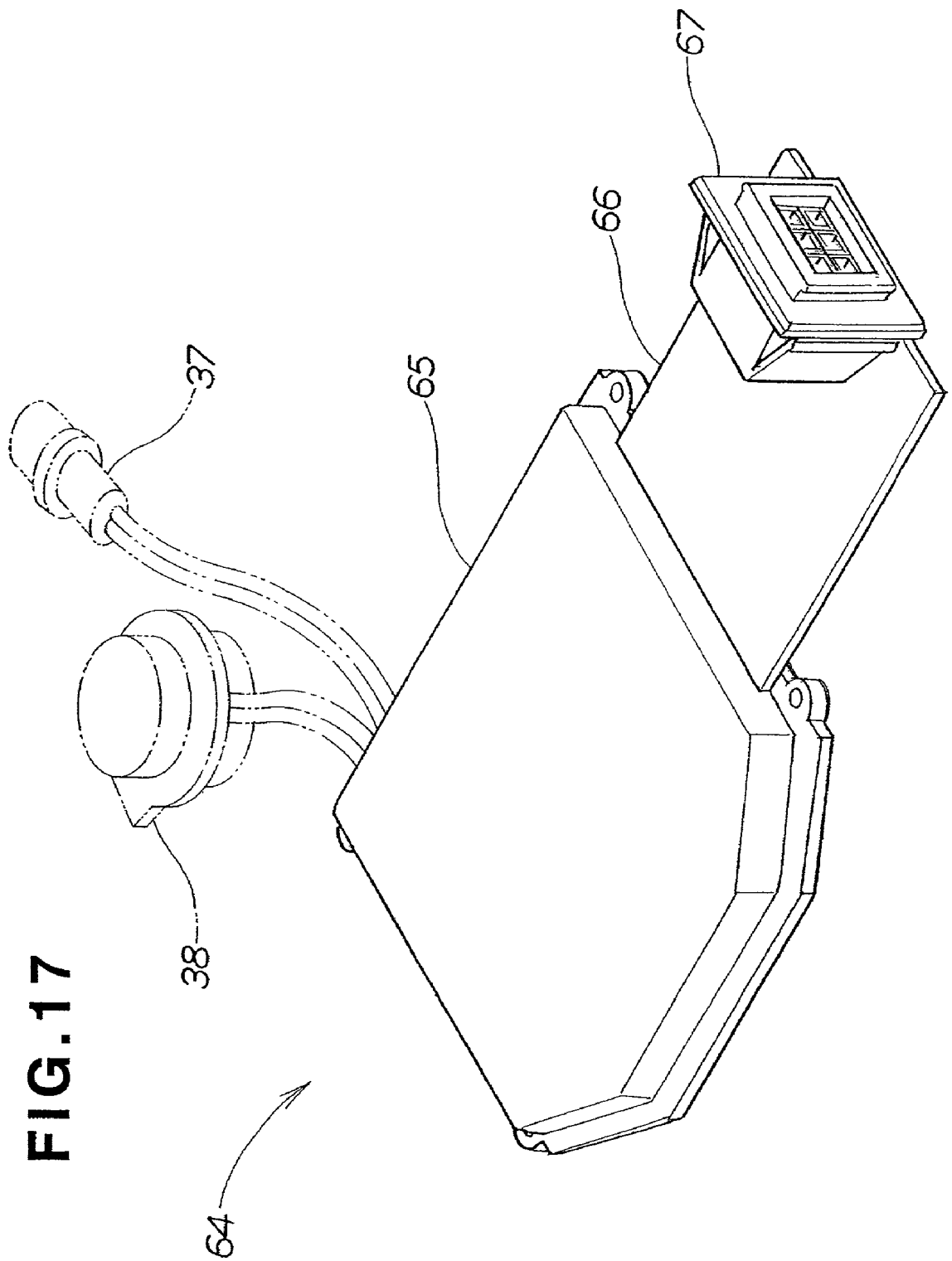
FIG. 17 is a perspective view of a modification of the electric lawn mower, which particularly shows a modified motor-controlling control section and relay member.

FIG. 17 is a perspective view of a modification of the electric lawn mower 10, which particularly shows a modified control section (i.e., modification of the above-described control section 24) 64 and modified relay member (i.e. modification of the above-described relay member 42) 67. The control section 64 includes a control case 65, control board 66 accommodated in the control case 65, and relay member 67 mounted directly on the control board 66 and functioning as a machine-side female socket for removable connection therein of the power on/off key 41. In this modification too, the display lamp 37 and buzzer 38 are connected to the control section 64.

Namely, the modification of FIG. 17 is characterized in that the relay member 67 is provided integrally with the control section 64 for controlling the electric motor 22 (FIG. 5). Such integral provision can eliminate a need for a separate harness or the like interconnecting the relay member 67 and control section 64 and permits even more efficient assemblage of the electric lawn mower 10.

Whereas the embodiment of the present invention has been described as including the scroll portion 31 at the left of the machine body section 11 and machine-side female connection (relay member 42 or 67) at the right of the machine body section 11, the left and right positions of the scroll portion 31 and machine-side female connection 42 or 67 may be reversed; that is, the scroll portion 31 may be provided at the right of the machine body section 11 and the female connection 42 or 67 may be provided at the left of the machine body section 11.

Further, whereas the embodiment of the present invention has been described in relation to the case where the powering on/off power on/off key 41 is removably inserted in the machine-side female connection (relay member 42 or 67), the power on/off key 41 may be replaced with any other type of connecting member for removable insertion in the machine-side female connection 42 or 67 to turn on/off the electric lawn mower or electric working machine.

In summary, the electric working machine of the present invention is characterized in that the scroll portion is provided at one of the left and right of the machine body section while the female connection (relay member or machine-side power switch) for removable insertion therein of the power on/off key is provided at the other of the left and right of the machine body section. Thus, the user can pull the power on/off key out of the female conenction in the machine body section and lay the machine body section down sideways while staying at a same side of the machine body section; that is, the user is allowed to perform the two operations: inserting or removing the power on/off key; and laying the machine body section down sideways, without having to change his or her operating position. As a result, the scroll portion can be cleaned with greatly enhanced efficiency.

Furthermore, the electric working machine of the present invention is characterized in that the relay member is provided between the motor-driving battery unit and the control section so that the battery unit and control section can be electrically connected with each other by insertion, in the relay member, of the power on/off key and electrically disconnected from each other by removal, from the relay member, of the power on/off key. Such an arrangement can minimize unnecessary electrical discharge from the battery unit during a quiescent period of the electric working machine, and prevent overdischarge during long-time storage of the working machine. As a result, the battery unit can have prolonged operating life.

The present disclosure relates to the subject matters of Japanese Patent Application Nos. 2001-252039 and 2001-252045, filed Aug. 22, 2001, the disclosures of which are expressly incorporated herein by reference in their entireties.

What is claimed is:

1. An electric working machine comprising:
a machine body section;
one or more rechargeable batteries mounted in the machine body section;
an electric motor driven by the batteries;
a control section for controlling the electric motor to allow the machine body section to travel and perform various functions; and
a single relay member provided between the batteries and the control section for electrical connection therebetween and having a single exposed connector into which a power on/off key or a battery charger connector are alternatively removably insertable, the batteries being charged by insertion of the battery charger connector into the exposed connector when the power on/off key is removed, and the battery and the control section being electrically connected to each other by insertion of the removable power on/off key into the exposed connector and being electrically disconnected from each other to disable the electric motor by removal of the power on/off key from the exposed connector.

2. An electric working machine according to claim 1; wherein the exposed connector is a female plug, the power on/off key is a male plug insertable into the female plug, and the battery charger connector is a male plug insertable into the female plug when the power on/off key is removed therefrom for conveying power from a power source for recharging the batteries.

3. An electric working machine according to claim 1; wherein the batteries are nickel-based or lithium-based batteries.

4. An electric working machine according to claim 1; wherein the control section has a temperature control circuit for monitoring and controlling a temperature of the batteries.

5. An electric working machine according to claim 1; wherein the relay member includes a positive terminal connected with a positive pole of the batteries, and the positive terminal of the relay member functions as a charging positive terminal for connecting a battery charger to the positive pole of the batteries.

6. An electric lawn mower comprising:
a machine body section having a cutter housing;
an exposed connector provided in the machine body section;
an electric motor mounted in the machine body section for being turned on by insertion into the exposed connector of a power on/off key and turned off by removal from the exposed connector of the power on/off key;
a cutter blade disposed within the cutter housing and rotatable via the electric motor to cut grass;
a scroll portion disposed in a rear portion of the cutter housing for electing grass clippings cut by the cutter blade into a grass bag removably attached to a rear portion of the machine body section;
one or more rechargeable batteries mounted in the machine body section for driving the electric motor; a control section for controlling the electric motor;
wherein the scroll portion is provided proximate one of left and right lateral sides of the machine body section and the exposed connector for removable insertion therein of the power on/off key is provided at the other of the left and right lateral sides of the machine body section, to thereby enable an operator of the electric lawn mower to remove the power on/off key from the exposed connector to disable the electric motor and lay the machine body section down sideways with the one lateral side of the machine body section facing downward for access to and cleaning of the scroll portion while standing at the other lateral side of the machine body section;
wherein the exposed connector is configured to removably receive only a single connector at one time including the power on/off key and a battery charger connector for recharging the batteries when the power on/off key is removed; and wherein the exposed connector is a female plug, the power on/off key is a male plug insertable into the female plug, and the battery charger connector is a male plug insertable into the female plug for conveying power from a power source for recharging the batteries.

7. An electric lawn mower comprising: a housing containing a cutting blade; an electric motor having an output shaft connected to the cutting blade; one or more rechargeable batteries for driving the electric motor; a control section for controlling the electric motor; a scroll portion provided near one lateral side of the housing for ejecting grass clippings of grass cut by the cutter blade; and a relay member connected between the batteries and the control section for electrical connection therebetween and having a single connector provided on a second lateral side of the housing opposite the first lateral side and into which a power on/off key or a battery charger connector are alternatively removably insertable, the batteries being charged by insertion of the battery charger connector into the single connector when the power on/off key is removed therefrom, and the batteries and the control section being electrically connected to each other by insertion of the removable power on/off key into the single connector and being electrically disconnected from each other to disable the electric motor by removal of the power on/off key from the single connector.

8. An electric lawn mower according to claim 7; wherein the single connector is a female plug, the power on/off key is a male plug insertable into the female plug, and the battery charger connector is a male plug insertable into the female plug only when the power on/off key is removed therefrom for conveying power from a power source for recharging the batteries.

* * * * *